UNITED STATES PATENT OFFICE.

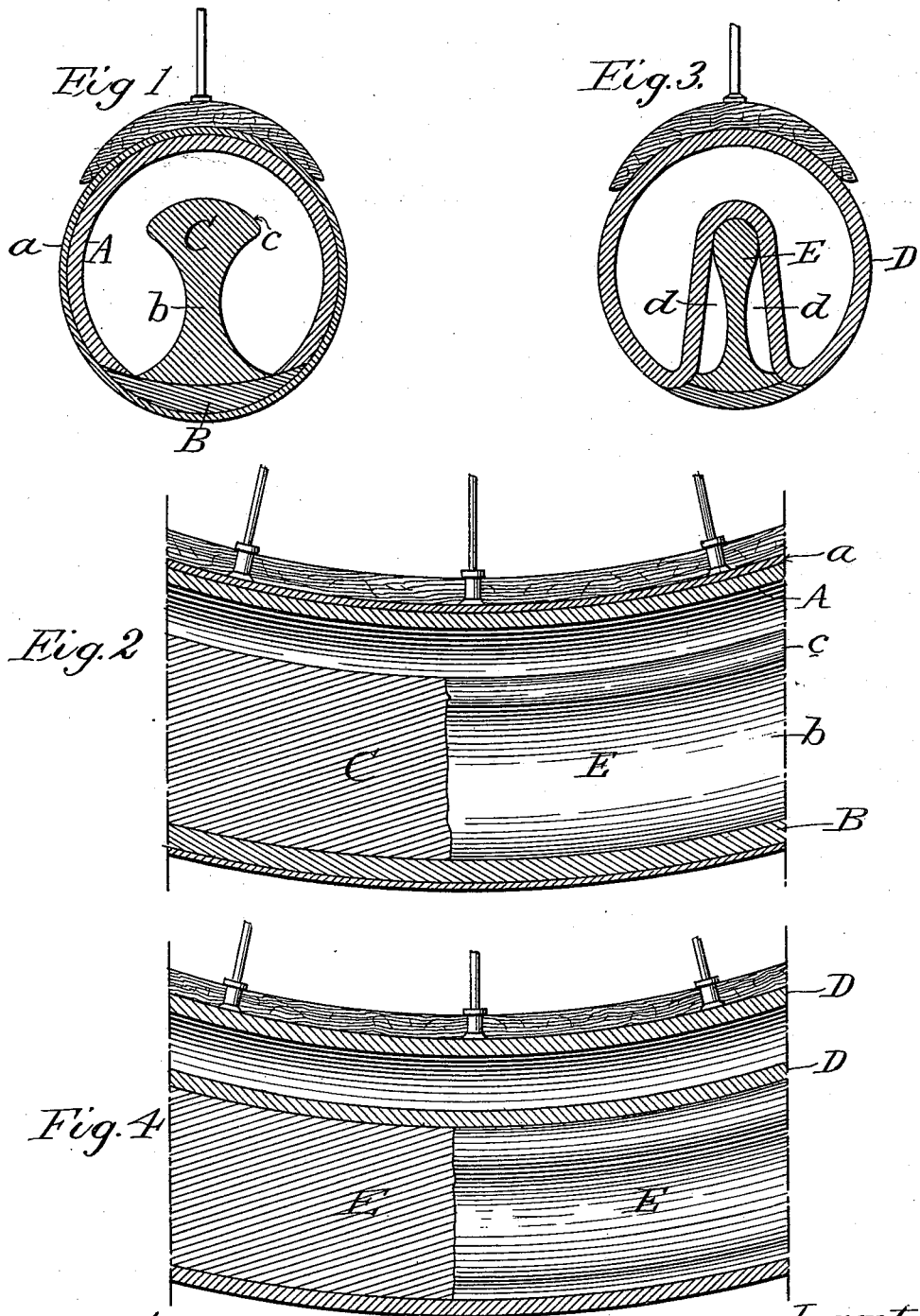

THADDEUS GALVIN, OF DETROIT, MICHIGAN.

TIRE.

SPECIFICATION forming part of Letters Patent No. 583,681, dated June 1, 1897.

Application filed July 11, 1896. Serial No. 598,860. (No model.)

*To all whom it may concern:*

Be it known that I, THADDEUS GALVIN, a citizen of the United States, residing at Detroit, in the county of Wayne and State of Michigan, have invented certain new and useful Improvements in Tires, of which the following is a specification.

My invention relates to tires for vehicles, the construction and objects of which will be hereinafter fully set forth, reference being had to the accompanying drawings, in which—

Figure 1 is a cross-sectional view of the preferred form of my improved tire; Fig. 2, a longitudinal sectional view of a portion of the same; Fig. 3, a cross-sectional view of a modified form, and Fig. 4 a longitudinal sectional view of said modified construction.

The object of my invention is to so construct and form the tire which is designed to be inflated that when it becomes punctured or otherwise rendered incapable of holding the air it may still be used without injury to the felly or to the tire itself. To attain this end, I provide the tire with an internal flange or rib, which is secured to the tread thereof and extends toward the opposite side of the tire, though not coming into actual contact therewith under normal conditions.

Referring to Figs. 1 and 2, A indicates the main body of the tire, B the tread or bearing-surface thereof, and C the internal rib or flange. It will be seen that I have shown the parts formed separately, but I do not desire to restrict myself to this method of building up the tire. The parts are assembled and an outer covering sheet or layer *a* cemented thereto, and when in this position the parts are vulcanized, forming, practically, one integral structure. The tread or shoe B is made heavier than the balance of the body of the tire and materially aids in preventing punctures. The rib or flange C is preferably made in the form shown—that is, it comprises a comparatively thin body portion *b*, the lower end being broadened out and securely vulcanized to the tread-section. The upper edge of the body terminates in a head *c*, the face of which is rounding. This head is designed to bear against the opposite face of the tire, or that portion secured to the felly, when the tire is in a collapsed or deflated condition.

The tread B and rib or flange C may be made integral and the tubular portion A vulcanized thereto.

Should the tire be punctured and the air escape therefrom, the weight of the rider would cause the head *c* of the rib to bear against that portion of the tire opposite the tread. The rib would thus give enough support to the tire to enable one to ride the machine without injury to the felly, a point of much importance where wooden fellies are employed. It is to be noted that the rib is connected to one portion of the tire only and that it does not extend entirely across its entire diameter. By so constructing it the resiliency of the tire is not impaired and but slight weight is added.

In Figs. 3 and 4 I have shown a modified form of construction wherein the same principle is involved. In this construction the body or tube D is made continuous and is formed with a U-shaped depression opposite to that portion which is attached to the rim or felly. Within this depression is secured, preferably by vulcanization, a rib E, similar in its general construction to the flange or rib C of Figs. 1 and 2. The head of the rib is designed to fit within the bend of the U-shaped recess and the base is broadened out and when in place forms a continuation of the rounding portion of the tube and also the tread or shoe of the tire; or instead of forming the rib and tread portion integral they may be formed separate and afterward united, in the course of vulcanization of the parts, to the tube D.

Under the construction just described air-chambers *d d* will be formed on both sides of the rib, and should the tire become collapsed they will aid the rib or shoe in sustaining the weight of the rider. The action of the device under this modified form under such conditions is precisely the same as under the construction set forth in Figs. 1 and 2.

When the tire is inflated under the construction shown in Figs. 3 and 4, the weight of the rider is sustained at the center of the tire. The pressure is transmitted through the outer tube D to the bottom of the U-shaped section, where it is transferred to the head of the rib.

While I prefer the construction set forth in

Figs. 1 and 2, I do not desire to limit myself to the method of assembling the parts therein shown, nor do I desire to be understood as confining myself to the exact arrangement and formation of the structure shown in Figs. 3 and 4.

Having thus described my invention, what I claim is—

1. A single-tube inflatable tire for vehicles comprising a tube provided with a U-shaped depression on one side extending nearly to the opposite face thereof; a rib or flange E having a rounded head, said head being designed to fit within the curved portion of the U-shaped section; and a shoe or tread closing the mouth of the U-shaped opening and designed to complete the curvature of the tire.

2. A single-tube inflatable tire for vehicles comprising a tube provided with a U-shaped depression on one side extending nearly to the opposite face thereof and forming an internal rib; and a shoe or tread secured within and closing the mouth of said section, thereby completing the contour of the tire.

In witness whereof I hereunto set my hand in the presence of two witnesses.

THADDEUS GALVIN.

Witnesses:
FRANKLIN L. LORD,
ADAM E. BLOOM.